US009945954B2

(12) United States Patent
McDonald et al.

(10) Patent No.: US 9,945,954 B2
(45) Date of Patent: Apr. 17, 2018

(54) USING SPACE-BASED AUGMENTATION SYSTEM (SBAS) GRID IONOSPHERE VERTICAL ERROR (GIVE) INFORMATION TO MITIGATE IONOSPHERE ERRORS FOR GROUND BASED AUGMENTATION SYSTEMS (GBAS)

(71) Applicant: Honeywell International Inc., Morristown, NJ (US)

(72) Inventors: James Arthur McDonald, Minneapolis, MN (US); Tom Jakel, Minneapolis, MN (US); Kim A. Class, Andover, MN (US)

(73) Assignee: Honeywell International Inc., Morris Plains, NJ (US)

( * ) Notice: Subject to any disclaimer, the term of this patent is extended or adjusted under 35 U.S.C. 154(b) by 601 days.

(21) Appl. No.: 14/549,382

(22) Filed: Nov. 20, 2014

(65) Prior Publication Data
US 2016/0146942 A1    May 26, 2016

(51) Int. Cl.
*G01S 19/07*     (2010.01)
*G01S 19/40*     (2010.01)
(Continued)

(52) U.S. Cl.
CPC .............. *G01S 19/07* (2013.01); *G01S 19/40* (2013.01); *G01S 19/03* (2013.01); *G01S 19/08* (2013.01); *G01S 19/12* (2013.01)

(58) Field of Classification Search
CPC .......... G01S 19/07; G01S 19/40; G01S 19/15; G01S 19/02; G01S 19/03; G01S 19/12
(Continued)

(56) References Cited

U.S. PATENT DOCUMENTS 5,631,838 A    5/1997  Ishikawa et al.
6,356,232 B1   3/2002  Rocken et al.
(Continued)

FOREIGN PATENT DOCUMENTS

CN    101839986    9/2010
IN       244673    12/2010

OTHER PUBLICATIONS

U.S. Patent and Trademark Office, "Office Action", "U.S. Appl. No. 13/847,645", dated Sep. 18, 2015.
(Continued)

*Primary Examiner* — Chuong P Nguyen
(74) *Attorney, Agent, or Firm* — Fogg & Powers LLC

(57) ABSTRACT

GBAS includes reference receivers, processing module, and communication device. Processing module checks GNSS satellite measurements to determine proximity of GNSS satellite measurement's IPP to IGPs derived from SBAS geostationary satellites. Processing module determines that GNSS satellite measurement is safe for mitigation using overbounded Vertical Ionosphere Gradient standard deviation sigma-vig ($\sigma_{vig}$) when IGPs possess acceptable GIVE values. Processing module determines whether number of GNSS satellite measurements determined safe for mitigation using $\sigma_{vig}$ are able to produce VPL that meets VAL required for precision approach. Communication device communicates overbounded $\sigma_{vig}$ along with differential corrections and indication of which GNSS satellite measurements that are safe for mitigation using at least one overbounded $\sigma_{vig}$ are able to produce VPL that meets VAL required for precision approach to GNSS receiver when number of GNSS satellite measurements determined safe for mitigation using overbounded $\sigma_{vig}$ are able to produce VPL that meets VAL required for precision approach.

20 Claims, 7 Drawing Sheets

(51) Int. Cl.
  *G01S 19/03* (2010.01)
  *G01S 19/12* (2010.01)
  *G01S 19/08* (2010.01)
(58) Field of Classification Search
  USPC .......... 342/357.44, 357.23, 357.53, 357.395, 342/357.4
  See application file for complete search history.

(56) References Cited

U.S. PATENT DOCUMENTS

| | | | | |
|---|---|---|---|---|
| 6,639,549 | B2 | 10/2003 | Vanderwerf et al. | |
| 6,647,340 | B1* | 11/2003 | Pemble | G01S 19/08 340/992 |
| 6,801,854 | B1 | 10/2004 | Pemble et al. | |
| 6,826,476 | B2 | 11/2004 | Ahlbrecht et al. | |
| 6,862,526 | B2* | 3/2005 | Robbins | G01S 5/009 340/995.21 |
| 7,031,730 | B1* | 4/2006 | Barber | G01S 19/07 342/357.23 |
| 7,423,582 | B2* | 9/2008 | Holderle | G01S 19/08 342/357.29 |
| 8,094,064 | B2* | 1/2012 | Brenner | G01S 19/08 342/357.26 |
| 8,106,823 | B2 | 1/2012 | Schroth | |
| 8,131,463 | B2 | 3/2012 | Lopez et al. | |
| 8,203,482 | B2 | 6/2012 | Azaola Saenz | |
| 8,305,266 | B2 | 11/2012 | Damidaux et al. | |
| 8,311,728 | B2* | 11/2012 | Coatantiec | G01S 19/47 701/472 |
| 8,344,946 | B2* | 1/2013 | Um | G01S 19/07 342/357.58 |
| 9,476,985 | B2* | 10/2016 | Scheitlin | G01S 19/07 |
| 9,557,419 | B2* | 1/2017 | Drescher | G01S 19/13 |
| 9,576,082 | B2* | 2/2017 | Sparks | G01S 19/07 |
| 9,651,668 | B2* | 5/2017 | Trilles | G01S 19/13 |
| 2005/0015680 | A1 | 1/2005 | Rubin et al. | |
| 2009/0096667 | A1* | 4/2009 | Shoarinejad | G01S 19/05 342/357.42 |
| 2009/0251365 | A1 | 10/2009 | Suzuki | |
| 2011/0291887 | A1 | 12/2011 | Pulford | |
| 2012/0206298 | A1 | 8/2012 | Alanen et al. | |
| 2012/0208557 | A1 | 8/2012 | Carter | |
| 2014/0285376 | A1 | 9/2014 | Scheitlin | |
| 2015/0054686 | A1* | 2/2015 | Sagiraju | G01S 19/07 342/357.73 |
| 2015/0145722 | A1* | 5/2015 | Johnson | G01S 19/07 342/357.44 |
| 2016/0282470 | A1* | 9/2016 | McDonald | G01S 19/05 |
| 2016/0306047 | A1* | 10/2016 | Jakel | G01S 19/07 |

OTHER PUBLICATIONS

Johnson et al., "Using SBAS Ionospheric Delay Measurements to Mitigate Iononspheric Error", "U.S. Appl. No. 14/171,257, filed Feb. 3, 2014", pp. 1-29, Published in: US.
European Patent Office, "Office Action from EP Application No. 14160168.2 dated Sep. 15, 2014", "from Foreign Counterpart of U.S. Appl. No. 13/847,645", dated Sep. 15, 2014, pp. 1-5, Published in: EP.
European Patent Office, "European Search Report from EP Application No. 14160168.2 dated Aug. 29, 2014", "from Foreign Counterpart of U.S. Appl. No. 13/847,645", dated Aug. 29, 2014, pp. 1-4, Published in: EP.
Lee et al., "Assessment of Nominal Ionosphere Spatial Decorrelation for LAAS", "Proceedings of IEEE/ION Plans 2006", Apr. 27, 2006, pp. 506-514.
Lee et al., "Position-Domain Geometry Screening to Maximize LAAS Availability in the Presence of Ionosphere Anomalies", Jul. 14, 2011, pp. 1-16.
Park et al., "Mitigation of Anomalous Ionosphere Threat to Enhance Utility of LAAS Differentially Corrected Positioning Service (DCPS)", "Proceedings of IEEE/ION Plans 2008", May 8, 2008, pp. 285-293.
Pullen et al., "The Impact and Mitigation of Ionosphere Anomalies on Ground-Based Augmentation of GNSS", "12th International Ionospheric Effects Symposium (IES 2008), Session 4A, Paper #6", May 14, 2008, pp. 1-24, Publisher: Stanford University.
Pullen et al., "Using SBAS to Enhance GBAS User Availability: Results and Extensions", "Use of External Information in GBAS", Nov. 12, 2010, pp. 1-24, Published in: JP.
Pullen at al., "Using SBAS to Enhance GBAS User Availability: Results and Extensions to Enhance Air Traffic Management (EIWAC 2010)", 2010, pp. 1-11, Publisher: Dept. of Aeronautics and Astronautics at Stanford University, Published in: US
Rife et al., "WAAS-Based Threat Monitoring for a Local Airport Monitor (LAM) That Supports Category I Precision Approach", Apr. 25-27, 2006, pp. 468-482, Publisher: Illinois Institute of Technology, Published in: US.
U.S. Patent and Trademark Office, "Advisory Action", "U.S. Appl. No. 13/847,645", dated May 26, 2016, pp. 1-4, Published in: US.
United States Patent and Trademark Office, "Final Office Action", "U.S. Appl. No. 13/847,645", dated Mar. 14, 2016, pp. 1-11, Published in: US.
U.S. Patent and Trademark Office, "Notice of Allowance", "Application U.S. Appl. No. 13/847,645", dated Jun. 22, 2016, pp. 1-5, Published in: US.
European Patent Office, "Extended European Patent Search Resport from EP Application No. 15194359.4 dated Mar. 31, 2016", "from Foreign Counterpart of U.S. Appl. No. 14/549,382", dated Mar. 31, 2016, pp. 1-9, Published in: EP.
Decleene, Bruce, "Defining Pseudorange Integrity—Overbounding", "Proceedings of the 13th International Technical Meeting of the Satellite Division of the Institute of Navigation", Sep. 22, 2000, pp. 1916-1924, Publisher: ION GPS 2000, Published in: Salt Lake City, Utah.
Datta-Barua et. al., "Using WAAS Ionospheric Data to Estimate LAAS Short Baseline Gradients", "NTM 2002—Proceedings of the 2002 National Technical Meeting of the Institute of Navigation, The Institute of Navigation", Jan. 30, 2002, pp. 523-530, Publisher: ION NTM, Published in: San Diego, CA.
Miannucci et. al., "Determining the Uncertainty of Ionospheric Corrections for Users in Wide Area Augmentation Systems", "NTM 1999—Proceedings of the 1999 National Technical Meeting of the Institute of Navigation, The Institute of Navigation", Jan. 27, 1999, pp. 761-768, Published in: US.
Wang K. et. al., "Assessment of Single-Difference Ionospheric Residuals in a Regional Network for GBAS", "Proceeding of the 27th International Technical Meeting of the ION Satellite Division", Mar. 12, 2014, pp. 2384-2393, Publisher: ION GNSS+, Published in: Tampa, Florida.
Wanner, Bill et. al., "Wide Area Augmentation System Vertical Accuracy Assessment in Support of LPV200 Requirements", "Journal of the Institute of Navigation", Dec. 1, 2008, pp. 191-203, vol. 55, No. 3, Fall 2008, Publisher: Navigation, Published in: US.
SC-159, "Minimum Operational Performance Standards for Global Positioning System/Wide Area Augmentation System Airborne Equipment", "RTCA DO-229C", Dec. 13, 2006, pp. 1-564, Publisher: RTCA Inc.
SC-159 "Minimum Operational Performance Standards for GPS Local Area Augmentation System Airborne Equipment", "DO-229D", Dec. 16, 2008, pp. 1-286, Publisher: RTCA, Inc.

\* cited by examiner

USING SPACE-BASED AUGMENTATION SYSTEM (SBAS) GRID IONOSPHERE VERTICAL ERROR (GIVE) INFORMATION TO MITIGATE IONOSPHERE ERRORS FOR GROUND BASED AUGMENTATION SYSTEMS (GBAS)

INCORPORATION BY REFERENCE OF RELATED APPLICATIONS

This patent application is related to the following:
U.S. Provisional Patent Application No. 61/909,900, entitled "GNSS USING SBAS IONOSPHERIC MEASUREMENTS IN CONJUNCTION WITH GBAS AIDING" filed on Nov. 27, 2013, which is hereby incorporated herein by reference; and
U.S. patent application Ser. No. 14/171,257, entitled "USING SBAS IONOSPHERIC DELAY MEASUREMENTS TO MITIGATE IONOSPHERIC ERROR" filed Feb. 3, 2014, which is hereby incorporated herein by reference.

BACKGROUND

Global Navigation Satellite Systems (GNSS) provide aircraft with navigation support in approach and landing operations. However, since the accuracy and precision requirements are high in these operations, Ground Based Augmentation Systems (GBAS) augment GNSS when an aircraft is near a GBAS Ground Subsystem. GBAS Ground Subsystems, also referred to herein as GBAS stations, augment GNSS receivers by broadcasting pseudorange corrections and integrity information to the aircraft, which helps remove GNSS errors impacting satellite measurements processed by the aircraft's GNSS receiver. As a result, aircraft can have improved continuity, availability, and integrity performance for precision approaches, departure procedures, and terminal area operations.

SUMMARY

A Ground Based Augmentation System (GBAS) includes a plurality of reference receivers having known positions; at least one processing module communicatively coupled to the plurality of reference receivers; and at least one aircraft communication device communicatively coupled to the at least one processing module. The at least one processing module is configured to check a Global Navigation Satellite System (GNSS) satellite measurement for each of a plurality of Global Navigation Satellite System (GNSS) satellites to determine the proximity of each Global Navigation Satellite System (GNSS) satellite measurement's Ionosphere Pierce Point (IPP) to a plurality of Ionosphere Grid Points (IGPs) derived from at least one Space-Based Augmentation System (SBAS) geostationary satellite. The at least one processing module is further configured to determine that the Global Navigation Satellite System (GNSS) satellite measurement for each of the plurality of Global Navigation Satellite System (GNSS) satellites is safe for mitigation using at least one overbounded Vertical Ionosphere Gradient standard deviation sigma-vig ($\sigma_{vig}$) when the Ionosphere Grid Points (IGPs) possess acceptable Grid Ionosphere Vertical Error (GIVE) values. The at least one processing module is further configured to determine whether a number of Global Navigation Satellite System (GNSS) satellite measurements determined safe for mitigation using the at least one overbounded Vertical Ionosphere Gradient standard deviation sigma-vig ($\sigma_{vig}$) are able to produce a Vertical Protection Limit (VPL) that meets a Vertical Alert Limit (VAL) required for a precision approach. The at least one processing module is configured to cause the at least one aircraft communication device to communicate the at least one overbounded Vertical Ionosphere Gradient standard deviation sigma-vig ($\sigma_{vig}$) along with differential corrections and an indication of which Global Navigation Satellite System (GNSS) satellite measurements that are safe for mitigation using the at least one overbounded Vertical Ionosphere Gradient standard deviation sigma-vig ($\sigma_{vig}$) are able to produce the Vertical Protection Limit (VPL) that meets the Vertical Alert Limit (VAL) required for a precision approach to an aircraft GNSS receiver when the number of Global Navigation Satellite System (GNSS) satellite measurements determined safe for mitigation using the at least one overbounded Vertical Ionosphere Gradient standard deviation sigma-vig ($\sigma_{vig}$) are able to produce a Vertical Protection Limit (VPL) that meets a Vertical Alert Limit (VAL) required for a precision approach.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
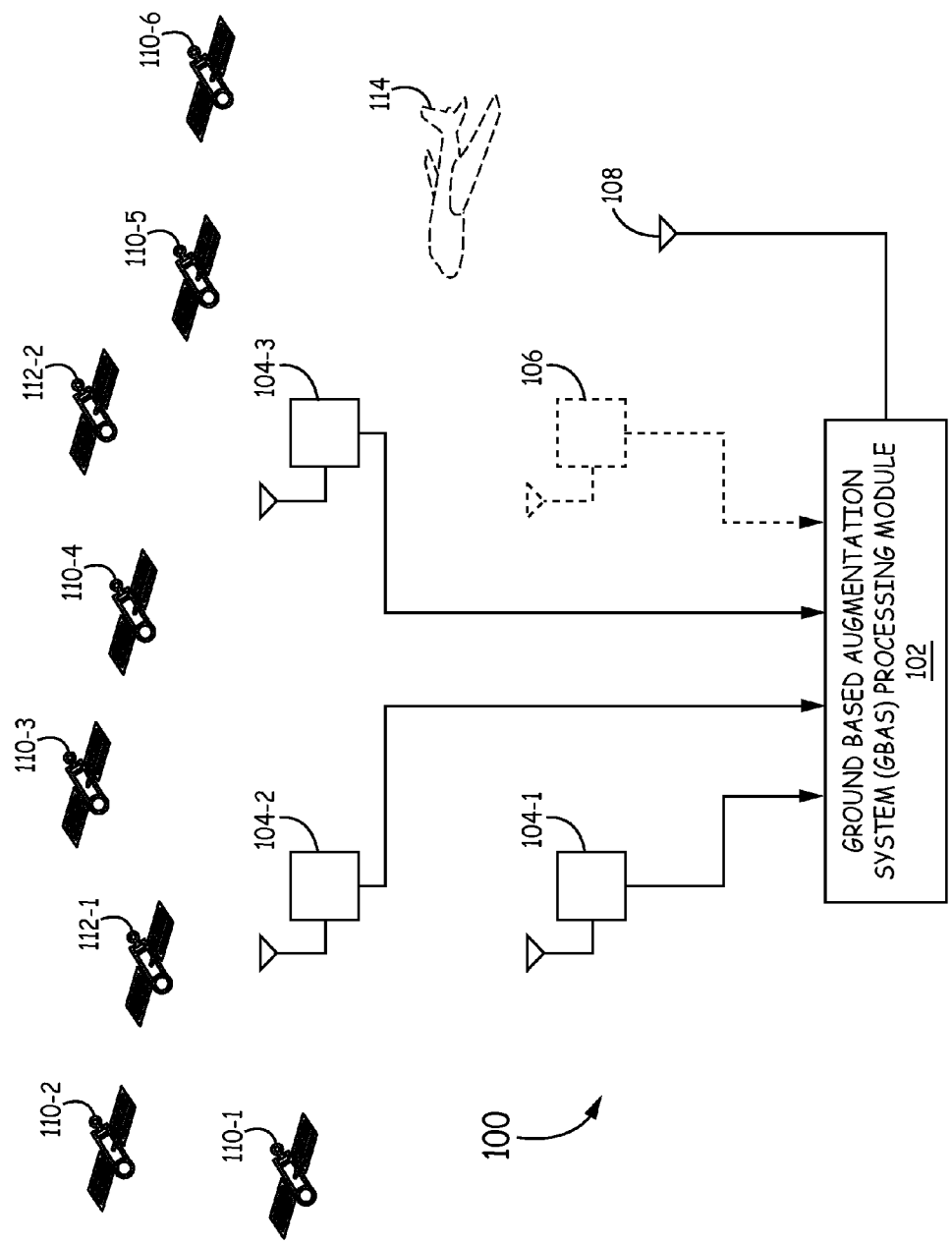
FIG. 1 is a block diagram of an exemplary embodiment of a Ground Based Augmentation System (GBAS) ground subsystem that uses Space-Based Augmentation System (SBAS) ionospheric delay measurements to select an ionospheric mitigation mechanism to be used based on a quality metric of the ionosphere.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In exemplary embodiments, Global Navigation Satellite Systems (GNSS) described herein include the United States' Global Positioning System (GPS) and Wide Area Augmentation System (WAAS), Russia's Global'naya Navigatsionnaya Sputnikovaya Sisterna (GLONASS), China's Beidou and Compass, the European Union's Galileo and European Geostationary Navigation Overlay Service (EGNOS), India's Indian Regional Navigational Satellite System (IRNSS), and Japan's Quasi-Zenith Satellite System (QZSS). In exemplary embodiments implementing GPS, L1 signals (operating around 1.57542 GHz) and/or L2 signals (operating around 1.2276 GHz) and/or L5 signals (operating around 1.17645 GHz) are implemented. In exemplary embodiments implementing GLONASS, SP signals at a first frequency (operating around 1.602 GHz) and/or SP signals at a second frequency (operating around 1.246 GHz) are implemented. In exemplary embodiments implementing COMPASS, B1 signals (operating around 1.561098 GHz), B1-2 signals (operating around 1.589742), B2 signals (operating around 1.20714 GHz) and/or B3 signals (operating around 1.26852 GHz) are implemented. In exemplary embodiments implementing Galileo, E5a and E5b signals (operating around 1.164-1.215 GHz), E6 signals (operating around 1.260-1.500 GHz), and/or E2-L1-E11 signals (operating around 1.559-1.592 GHz) are implemented.

As discussed above, Ground Based Augmentation Systems (GBAS) can enable improved continuity, availability, and integrity performance for precision approaches, departure procedures, and terminal area operations. GBAS is generally limited to the property of a single airport. A major source of error that can impact the GNSS satellite measurements processed by a GNSS receiver is due to the signal delay caused by the ionosphere. This error can almost be completely mitigated by the GBAS when the ionosphere is uniform between the aircraft's GNSS receiver and the GBAS station because the GBAS station and the aircraft's GNSS receiver will be experiencing similar signal delays due to the uniformity of the ionosphere. However, when ionospheric disturbances produce a non-uniform ionosphere that results in delay differences in the ionosphere between the GBAS station's and aircraft's lines of sight to the GNSS satellite, the GBAS station's pseudorange corrections applied at the aircraft can be less accurate. This is because of the spatially decorrelated error between the GBAS station and the aircraft's GNSS receiver due to the varying delays caused by the ionosphere at each location. In some cases, the ionosphere can cause significant delays on the GNSS signals on the order of meters that can transfer over to meters of position error in the airborne position. Since the integrity of the fault-free output of the airborne receiver is the responsibility of the ground station, the Federal Aviation Administration (FAA) requires that any GBAS be able to mitigate these errors or potential breaches of integrity. This is accomplished through real time estimations of the potential threat to the airborne receiver and bounding the potential threat, which reduces the availability performance of the GBAS. Bounding the airborne position is important when performing precision approaches. In exemplary embodiments, the position is bound by a cylindrical shaped boundary, referred to as a protection limit, around the aircraft having a vertical component and a lateral component. In other embodiments, boundaries having other shapes are used. In exemplary embodiments, the vertical component is bound to less than 10 meters such that the aircraft is actually within 10 meters of where it thinks it is with a high probability (such as $1-10^{-7}$).

GBAS are sensitive to differential range errors caused by spatial de-correlation in the ionosphere induced delay on GNSS satellite signals (this phenomenon is referred to as an ionospheric gradient). It is possible during anomalous ionospheric activity for a spatial variation in the delay (referred to as an ionospheric gradient) experienced by the ground substation and airborne user to form, such that the airborne user could experience unacceptably large position errors. Ionospheric storms, anomalous ionospheric activity, ionosphere induced delays, and ionospheric gradients occur in the upper atmosphere (around a couple hundred kilometers in altitude) and are based on electronic activity such as solar flares and other solar activity. Over large distances between the GBAS ground station and an airborne user, it is possible for the variation in ionospheric delay to result in unacceptably large range errors which could be prohibitive to safe precision approach operations. Mitigation of large ionospheric gradients can be accomplished via (1) cooperative mitigation between the airborne and ground components of the GBAS; or (2) conservative screening based on worst case GNSS satellite geometries combined with worst case ionospheric gradients. Option 1 requires advanced equipment for both the ground and airborne sub-systems, while option 2 can come at the expense of degraded system availability.

In exemplary embodiments, a real-time screen of all possible GNSS satellite geometries is performed which removes measurements which might lead to unacceptable airborne user position errors in the presence of the worst case anomalous ionospheric gradient. In exemplary embodiments, this real-time screen is performed using Anomalous Ionospheric Geometry Screening (AIGS). More specifically, a GBAS could automatically assume the worst case ionospheric gradient is always present. Then, when a GBAS station checks the possible GNSS satellite geometry configurations that an approaching aircraft could be using, any GNSS satellite geometries that produce an error larger than a tolerable error limit, assuming the worst case ionospheric gradient is present, are broadcast to the aircraft with identification that they should not be used by the aircraft.

In exemplary embodiments implementing geometry screening, the set of available geometries is restricted by increasing/inflating integrity-related parameters broadcast by the ground station such that only usable geometries are available. In exemplary embodiments, this includes: (1) identifying all credible airborne geometries; (2) computing a Maximum Ionospheric Error in Vertical Position (MIEV); (3) computing the smallest possible Vertical Protection Limit (VPL) (and/or Lateral Protection Limit (LPL)) for this potentially hazardous subset of credible geometries; (4) when any geometries in this subset have a Vertical Protection Limit (VPL) (and/or Lateral Protection Limit (LPL)) less than the Vertical Alert Limit (VAL) (and/or Lateral Alert Limit (LAL)) for the particular category of precision approach, begin a search to find the smallest inflation factors that increase the VPL (and/or LPL) above the VAL (and/or LAL) for all geometries in the subset of credible geometries.

One such broadcast parameter is the Vertical Ionosphere Gradient (VIG) standard deviation, also referred to as sigma-vig ($\sigma_{vig}$). Typically $\sigma_{vig}$ is calculated for a future time based on the GNSS satellites that will be in view of the GBAS at a future time. In exemplary embodiments, since GNSS satellites orbit the earth twice each sidereal day, over time, different GNSS satellites rise and set from the perspective of the GBAS. On every cycle, the calculation of $\sigma_{vig}$ is performed for a subsequent time epoch for all predicted GNSS satellites which will be in view of the GBAS at the future time on all predicted sub-geometries. This real time geometry screening is applicable for protecting all approaches at an airport. The larger the values between the $\sigma_{vig}$ calculated for one time step in the figure, and the $\sigma_{vig}$ value previously computed for the current time step is broadcast to the GNSS receivers. Making these assumptions can be less advantageous under certain circumstances because assuming worst case ionospheric gradients can degrade continuity performance and availability for Category I (CAT-I) approach operations and prohibit more advance operations, such as Category II (CAT-II) approaches or Differential Correction Positing Service (DCPS). Moreover, since the worst case ionospheric conditions in the United States have historically been present at a GBAS station only about once every ten years, making the worst case assumption often results in underutilized resources.

Systems implementing aspects of this disclosure can solve this problem by utilizing Space-Based Augmentation System (SBAS) data to provide visibility and insight to any impending non-uniform ionosphere that threatens the integrity and reduces the accuracy of the GBAS. An SBAS is a wide area network of ground systems that process information for larger geographic areas (such as the entire United States or another large area of land or water) and uploads them to SBAS geostationary (GEO) satellites that remain over the same location of the earth. These SBAS geostationary satellites provide correction and also other error information to GNSS receivers. SBAS works similarly to how GBAS works, but it is on a much wider scale. GBAS and SBAS are complementary systems because they can deal with the same problem in different ways with different observability. Specifically, the SBAS can observe things from much further distances from the GNSS receiver than GBAS. Exemplary SBAS include the Wide Area Augmentation System (WAAS) developed by the Federal Aviation Administration (FAA) to augment the Global Positioning System (GPS).

SBAS uses a network of ground-based stations with known fixed positions. These ground-based stations, with highly accurate known positions, calculate the delay from all in view GNSS satellites due to their Ionosphere Pierce Points (IPP). After calculating the various delays, the ground based stations transmit this information to master stations, which compute the ionospheric delays using a fixed grid system, then upload the information to SBAS geostationary satellites periodically (approximately every five minutes or more often). The SBAS geostationary satellites then broadcast this array of time delay information to SBAS-enabled GNSS receivers. Note that the terms "an array of ionospheric delay data" and "Ionospheric Grid Point delays" are used interchangeably.

FIG. 1 is a block diagram of an exemplary embodiment of a Ground Based Augmentation System (GBAS) ground subsystem 100 that uses Space-Based Augmentation System (SBAS) ionospheric delay measurements to select an ionospheric mitigation mechanism to be used based on a quality metric of the ionosphere. In exemplary embodiments, the GBAS ground subsystem 100 includes a Ground Based Augmentation System (GBAS) processing module 102, a plurality of reference receivers 104 (including reference receiver 104-1, reference receiver 104-2, and reference receiver 104-3), optional SBAS receiver 106, and an aircraft communication device 108. In exemplary embodiments, greater or fewer reference receivers 104 are included. In exemplary implementations, four reference receivers 104 are included.

In exemplary embodiments, the GBAS processing module 102 includes a processor that includes or functions with software programs, firmware or other computer readable instructions for carrying out various methods, process tasks, calculations, and control functions, used in the functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, the GBAS reference receivers 104 are each configured to receive GNSS signals from in-view GNSS satellites 110 (including any of GNSS satellite 110-1, GNSS satellite 110-2, GNSS satellite 110-3, GNSS satellite 110-4, GNSS satellite 110-5, and/or GNSS satellite 110-6, etc.). In exemplary embodiments, the GBAS processing module 102 is configured to receive GNSS data from the GBAS reference receivers 104 and to use this data and knowledge about the precise geographic location of the GBAS reference receivers 104 to determine an error in the GNSS based calculations of the GBAS reference receiver 104's location. In exemplary embodiments, these errors in the GNSS based calculations are used to provide error data to GNSS aircraft receivers using the aircraft communication device 108. While this is described as an aircraft communication device 108 used to provide error data to GNSS aircraft receivers, in other embodiments the error data is provided to GNSS receivers of other vehicles, objects, things, or people.

In exemplary embodiments, optional SBAS receiver 106 is configured to receive SBAS information from any of SBAS geostationary satellites 112 (including SBAS geostationary satellite 112-1, and/or SBAS geostationary satellite 112-2, etc.). In other embodiments, at least one of the GBAS reference receivers 104 themselves are configured to receive SBAS information from any of SBAS geostationary satellites 112 (including SBAS geostationary satellite 112-1, and/or SBAS geostationary satellite 112-2, etc.). In exemplary embodiments, the GBAS processing module 102 is also configured to take advantage of SBAS information from SBAS geostationary satellites 112 to improve the accuracy and integrity of the GBAS ground subsystem 100. In particular, a GBAS processing module 102 can use the array of ionospheric delay data provided by SBAS geostationary satellites 112 to determine if the potential for an ionospheric gradient exists (which could be caused by an ionospheric storm or other ionospheric activity). Uniformity of the ionospheric delays from various pierce points across a region relates inversely to the risk of ionospheric gradients and large irregularities impacting operations served by GBAS ground subsystem 100. Using the SBAS information over more pierce points, the GBAS processing module 102 can determine if the ionosphere is affecting the delays measured by the GBAS processing module 102 and an aircraft 114's GNSS receiver differently. If the difference between the ionospheric delays experienced by the GBAS ground subsystem 100 and the aircraft 114's GNSS receiver is below a threshold, the geometric screening and $\sigma_{vig}$ inflation techniques used by the GBAS processing module 102 can be suspended and a more simple technique of overbounding the Vertical Ionosphere Gradient standard deviation sigma-vig ($\sigma_{vig}$) can instead be performed. In exemplary embodiments, by overbounding the Vertical Ionosphere Gradient standard deviation sigma-vig ($\sigma_{vig}$), the range error on the measurement from at least one GNSS satellite is overbound.

In exemplary embodiments, if the estimates of vertical position errors get so large that they exceed 10 meters with the bound, a precision approach will not be available because it is not possible to bound this position around the aircraft 114 tight enough. If precision approaches are not available, the aircraft 114 may not be able to do a CAT-I precision approach and it would either need to find an alternative airport or the pilots would need to perform a visual approach and/or use non-GNSS based navigation tools, such as Instrument Landing System (ILS). Integration of the GBAS ground subsystem 100 with a Space Based Augmentation System (SBAS) by using data from the SBAS geostationary satellites 112 provides an alternative which does not require updates to the aircraft 114's GNSS equipment while also providing significant improvements over the availability performance associated with the geometric screening and $\sigma_{vig}$ inflation techniques.

In exemplary embodiments, information from SBAS geostationary satellites 112 is used to determine the quality of the ionosphere at any given moment. In exemplary embodiments, when it is determined that the quality of the ionosphere is not sufficient, the decision is made to use the more complicated mitigation technique of geometry screening and $\sigma_{vig}$ inflation that assumes the worst case ionospheric storm is present and always assumes that the errors in the system are being driven to that worst case level. In exemplary embodiments, when it is determined that the quality of ionosphere is sufficient, the decision is made that more complicated mitigation techniques (such as geometry screening and $\sigma_{vig}$ inflation) are not necessary. Instead, a simple overbound of the Vertical Ionosphere Gradient standard deviation sigma-vig ($\sigma_{vig}$) is used based on the worst possible error that could be present on a GNSS satellite based on the information provided from the SBAS geostationary satellites 112. In exemplary embodiments, the overbound of the Vertical Ionosphere Gradient standard deviation sigma-vig ($\sigma_{vig}$) is a one-σ (one-sigma) ionosphere error overbound value. This enables less complicated analysis and enables more availability for precision approaches. In exemplary embodiments, overbounding of the Vertical Ionosphere Gradient standard deviation sigma-vig ($\sigma_{vig}$) can be accomplished by increasing the error bounding distance from the aircraft 114 by adding a K factor and/or sigma multiplier. For example, a one meter one sigma type error indicating that 67% of the time the aircraft 114 is within one meter and is Gaussian distributed can be statistically overbound to 95% by multiplying it by two and broadcasting to a user that there is a two meter Vertical Ionosphere Gradient standard deviation sigma-vig ($\sigma_{vig}$) overbound on this ranging source. This assures that 95% of the time, the range error is not going to exceed 2 meters during fault free conditions. In exemplary embodiments, the GBAS ground subsystem can switch between the overbounding technique and the more complicated screening techniques based on the circumstances. In exemplary embodiments, greater or fewer GNSS satellites would be used depending on which technique is used. In exemplary embodiments, the GBAS ground subsystem can switch between the overbounding technique and the screening techniques and switch the set of GNSS satellites used seamlessly.

In exemplary embodiments, Space Based Augmentation System (SBAS) Grid Ionosphere Vertical Error (GIVE) information from the SBAS geostationary satellites 112 is used to determine if a GNSS satellite 110 measurement is sufficiently close to or surrounded by SBAS GIVE reference points (referred to as Ionosphere Grid Points (IGP)), such that the residual ionosphere error on the GNSS satellite 110 measurement can be protected via a one-σ (one-sigma) ionosphere error overbound of the Vertical Ionosphere Gradient standard deviation sigma-vig ($\sigma_{vig}$) broadcast by the GNSS ground subsystem 100 to the aircraft 114's GNSS equipment. In exemplary embodiments, SBAS IGP GIVE values are mapped to a residual ionosphere error which the GBAS ground subsystem 100 can overbound with a broadcast overbound Vertical Ionosphere Gradient standard deviation sigma-vig ($\sigma_{vig}$).

In exemplary embodiments, functionality is implemented by the Ground Based Augmentation System (GBAS) processing module 102 of the GBAS ground subsystem 100. The functionality checks each GNSS satellite 110 measurement to determine the proximity of the GNSS satellite 110 measurement's Ionosphere Pierce Point (IPP) to a series of SBAS geostationary satellite's broadcast Ionosphere Grid Points (IGPs). If the IGPs poses acceptable GIVE values, the GNSS satellite measurement will be considered safe for mitigation via an overbound Vertical Ionosphere Gradient standard deviation sigma-vig ($\sigma_{vig}$) based on a one-σ (one-sigma) ionosphere error overbound value. After considering each GNSS satellite 110 measurement observable to the GBAS ground subsystem 100, the functionality will then determine if the number of GNSS satellites 110 meeting the Vertical Ionosphere Gradient standard deviation sigma-vig ($\sigma_{vig}$) with the one-σ (one-sigma) ionosphere error overbound value will be able to produce a Vertical Protection Limit (VPL) which would be able to meet the Vertical Alert Limit (VAL) required for a precision approach. In exemplary embodiments, the VAL for a CAT-I approach is 10 meters. If the computed VPL is less than VAL, the GNSS satellites 110 meeting the overbound Vertical Ionosphere Gradient standard deviation sigma-vig ($\sigma_{vig}$) criteria will be broadcast to aircraft 114's GNSS equipment along with differential corrections and the overbound Vertical Ionosphere Gradient standard deviation sigma-vig ($\sigma_{vig}$) value corresponding to the GIVE values around each GNSS satellite 110's Ionosphere Pierce Point (IPP). The functionality could provide a Vertical Ionosphere Gradient standard deviation sigma-vig ($\sigma_{vig}$) based on a one-σ (one-sigma) ionosphere error overbound value separately for each GNSS satellite 110 measurement (depending on the IGP GIVE values around each measurement) or the functionality could provide a single Vertical Ionosphere Gradient standard deviation sigma-vig ($\sigma_{vig}$) based on a one-σ (one-sigma) value which covers the worst case GNSS satellite 110 measurement.

In exemplary embodiments, if the GBAS processing module 102 determines that there is currently an ionosphere storm (or other ionospheric interference) at a certain level, the system would a apply a hysteresis by waiting a certain timeout period (such as a number of minutes and/or hours) before resuming SBAS based operation. In exemplary embodiments, the timeout period is determined by looking at data from a number of stations over a number of days to determine how increasing and/or decreasing this timeout period affects the gradient distribution. In exemplary embodiments, a sensitivity analysis is performed to the timeout period to select a timeout period where the gradient distribution collapsed to be similar to what the gradient distribution was under a quiet day without these ionospheric storms present. For example, if a particular gradient distribution was present for a very bad storm that has very large ionospheric gradients that are present in a period of time where the regional system SBAS says there shouldn't be any ionospheric gradients present, that may be because the SBAS system is not directly measuring the local ionosphere where the GBAS ground subsystem 100 is located. Accordingly, in exemplary embodiments the timeout period is selected to be a duration when the distribution of ionospheric gradients for a particular geographic area have historically collapsed to what we would expect on an normal day with a particular decreased GIVE value (such as a GIVE value of 6). Accordingly, in exemplary embodiments, the GBAS processing module 102 determines that the system is not able to function adequately once a certain threshold of ionospheric gradients were met and the hysteresis using the timeout period was used to allow the GBAS ground subsystem 100 to reach a more normal state before it was considered to again be functioning adequately enough to provide valid data.

Figure 2:
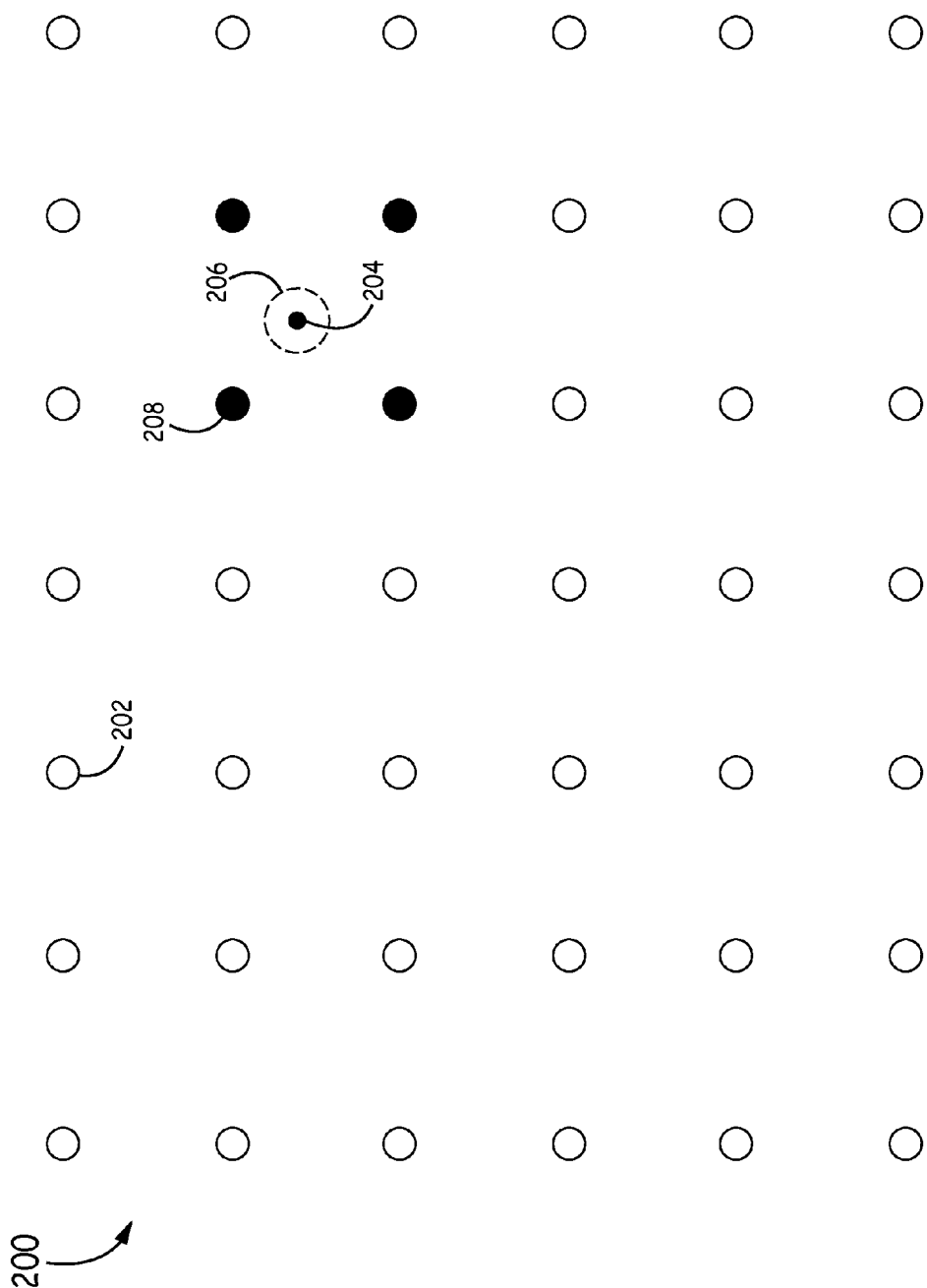
FIG. 2 is a block diagram showing a grid of Ionosphere Grid Points (IGP) 202 over a geographic area and an Ionosphere Pierce Point (IPP) positioned between four of the IGPs.

FIG. 2 is a block diagram showing a grid 200 of Ionosphere Grid Points (IGP) 202 over a geographic area and an Ionosphere Pierce Point (IPP) 204 positioned between four of the IGPs 202. The Ionosphere Pierce Point (IPP) 204 is positioned between four shaded Ionosphere Grid Points (IGP) 208. The Ionosphere Pierce Point (IPP) 204 includes an operational radius 206 surrounding the Ionosphere Pierce Point (IPP) 204. In exemplary embodiments, the four shaded Ionosphere Grid Points (IGP) 208 are the IGPs that the GIVE values are calculated for to determine whether they are acceptable as described above.

Figure 3:
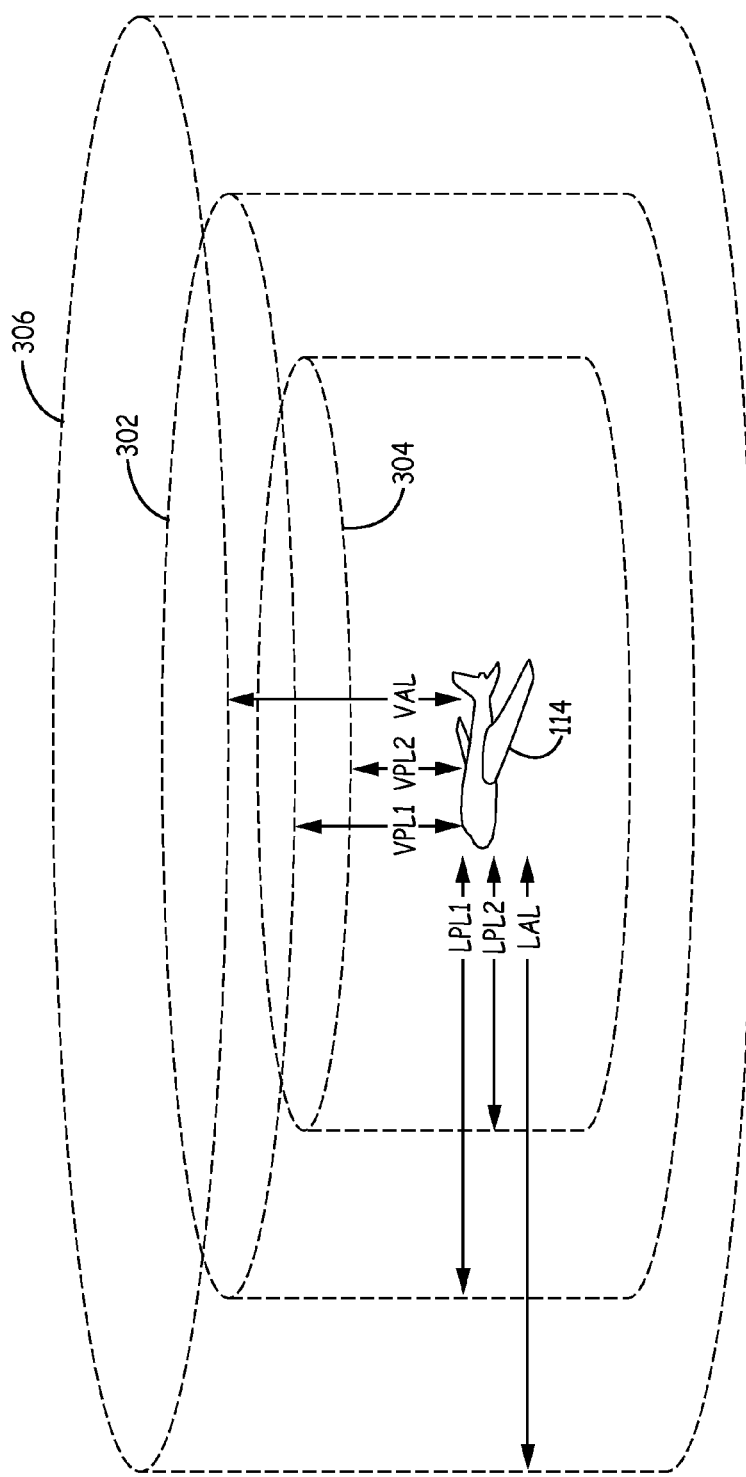
FIG. 3 is a block diagram showing the protection limit sensitivity to an overbound criteria for a Vertical Ionosphere Gradient standard deviation sigma-vig ($\sigma_{vig}$) used in an ionospheric mitigation mechanism.

FIG. 3 is a block diagram showing the aircraft 114 and both a spatial bounding 302 defined by on one or more protection limits (such as a first Vertical Protection Limit (VPL1) and/or a first Lateral Protection Limit (LPL1)) based on an inflated geometry screening based methodology and a spatial bounding 304 defined by one or more protection limits (such as a second Vertical Protection Limit (VPL2) and/or a second Lateral Protection Limit (LPL2)) based on a SBAS based overbound Vertical Ionosphere Gradient standard deviation sigma-vig ($\sigma_{vig}$). As can be seen in FIG. 3, the spatial bounding 304 is tighter than the spatial bounding 302, meaning it allows for higher accuracy. Spatial bounding 306 is defined by one or more alert limits (such as a Vertical Alert Limit (VAL) and/or a Lateral Alert Limit (LAL)). In exemplary embodiments, the Vertical Protection Limit (VPL) and Vertical Alert Limit (VAL) are more often at issue than the Lateral Protection Limit (LAL) and Lateral Alert Limit (LAL) because you don't get as good of GNSS data for computing the vertical component of the position (altitude) as you do the lateral components of the position (longitude and latitude) based on the GNSS satellite geometries. While FIG. 3 shows an aircraft 114, in other embodiments other vehicles, objects, things, or people have a spatial bounding 302 and/or a spatial bounding 304. In exemplary embodiments, spatial bounding 302, spatial bounding 304, and spatial bounding 306 are cylindrical shaped spatial boundings. In other embodiments, any of spatial bounding 302, spatial bounding 304, and spatial bounding 306 have different shapes and/or geometries. In exemplary embodiments, spatial bounding 302 and/or spatial bounding 304 are dynamic, changing in real-time and if they get too large, they will exceed the spatial bounding 306 defined by the one or more protection limits.

In exemplary embodiments when the overbound Vertical Ionosphere Gradient standard deviation sigma-vig ($\sigma_{vig}$) is selected as the ionospheric mitigation mechanism, the overbound Vertical Ionosphere Gradient standard deviation sigma-vig ($\sigma_{vig}$) is selected to be a one-σ (one-sigma) ionosphere error overbound value, where a (sigma) is the standard deviation. This one-σ (one-sigma) ionosphere error overbound value is used when the GBAS ground subsystem 100 determines that a enough GNSS satellite measurements are safe for mitigation using the one-σ (one-sigma) ionosphere error overbound value so that the number of GNSS satellites 110 meeting the one-σ (one-sigma) ionosphere error overbound value criteria will be able to produce a vertical protection limit (VPL) which would be able to meet the vertical alert limit (VAL) required for a precision approach. Specifically, if the computed vertical protection limit (VPL) is less than the vertical alert limit (VAL), an indication of the GNSS satellites 110 meeting the overbound criteria will be broadcast to the aircraft 114 (and other GBAS users) along with differential corrections and the one-σ (one-sigma) ionosphere error overbound value. In exemplary embodiments, the indication of the GNSS satellites 110 meeting the overbound criteria includes a list of the GNSS satellites 110 meeting the overbound criteria. In other exemplary embodiments, the indication of GNSS satellites 110 meeting the overbound criteria includes a list of the GNSS satellites 110 that do not meet the overbound criteria, which should not be used.

In exemplary embodiments, this one-σ (one-sigma) ionosphere error overbound value corresponds to the SBAS Grid Ionosphere Vertical Error (GIVE) values around each GNSS satellite's Ionosphere Pierce Point (IPP). In exemplary embodiments, the one-σ (one-sigma) ionosphere error overbound Vertical Ionosphere Gradient standard deviation sigma-vig ($\sigma_{vig}$) is provided separately for each GNSS satellite measurement (depending on the IGP GIVE values around each measurement). In other exemplary embodiments, the one-σ (one-sigma) ionosphere error overbound Vertical Ionosphere Gradient standard deviation sigma-vig ($\sigma_{vig}$) is provided as a single value which covers the worst case GNSS satellite measurement.

Figure 4:
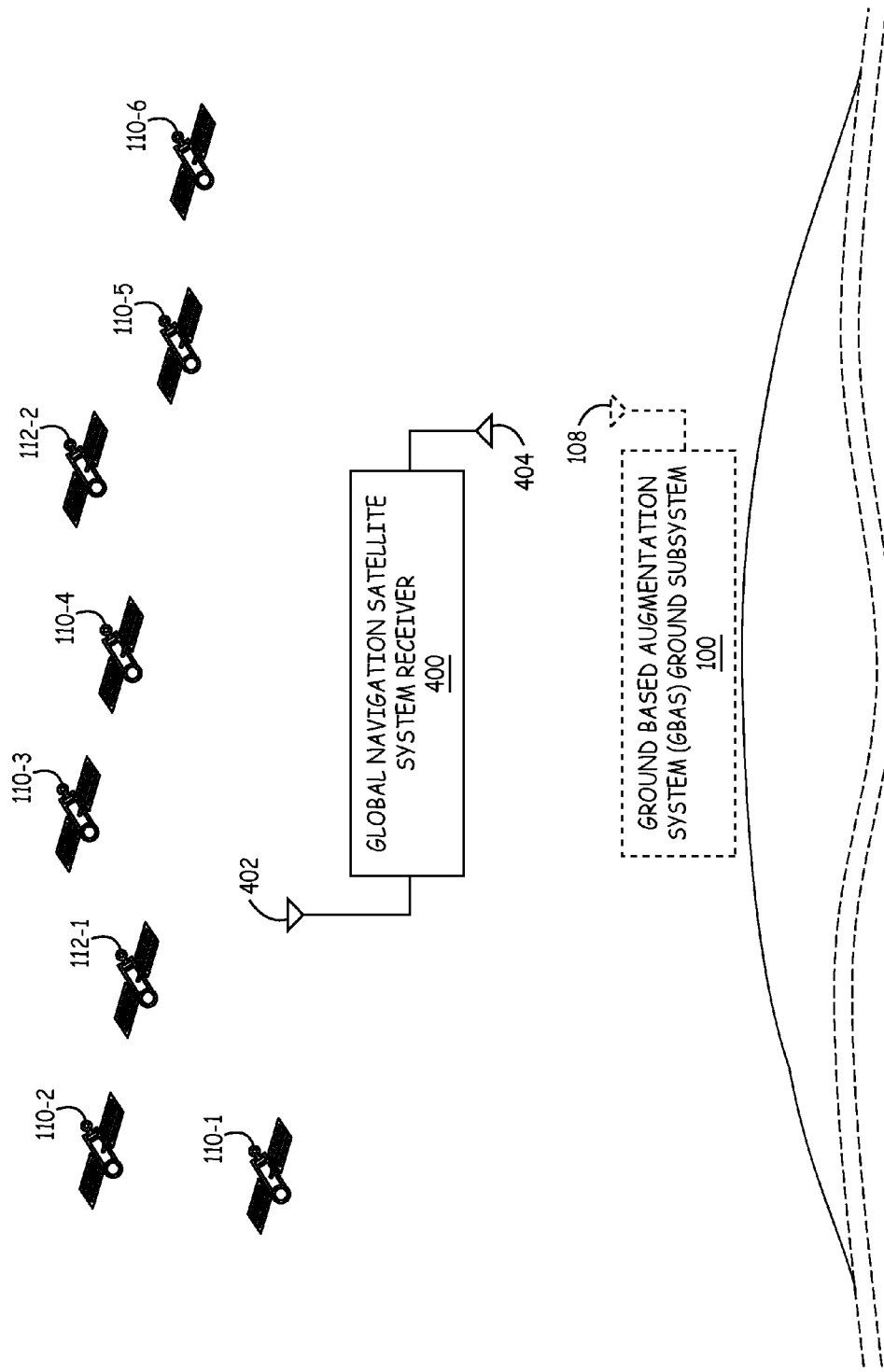
FIG. 4 is a block diagram of an exemplary embodiment of a Global Navigation Satellite System (GNSS) receiver onboard an aircraft.

FIG. 4 is a block diagram of an exemplary embodiment of a Global Navigation Satellite System (GNSS) receiver 400 onboard an aircraft, such as aircraft 114. In exemplary embodiments, the GNSS receiver 400 includes at least one GNSS antenna 402 for receiving GNSS signals from a plurality of GNSS satellites 110 and at least one GBAS antenna 404 for receiving signals from the aircraft communication device 108 of the GBAS ground subsystem 100. In exemplary embodiments, the at least one GBAS antenna 404 receives indication of the GNSS satellites 110 meeting the overbound criteria along with differential corrections and at least one one-σ (one-sigma) ionosphere error overbound value. In exemplary embodiments, the one-σ (one-sigma)

ionosphere error overbound value corresponds to the GIVE values around each GNSS satellite 110's Ionosphere Pierce Point (IPP). In exemplary embodiments, a distinct one-σ (one-sigma) ionosphere error overbound value for each GNSS satellite 110 measurement (depending on the IGP GIVE values around each measurement) is received separately. In other exemplary embodiments, a single one-σ (one-sigma) value which covers the worst case GNSS satellite 110 measurement is received.

In exemplary embodiments, the indication of the GNSS satellites 110 meeting the overbound criteria includes a list of the GNSS satellites 110 meeting the overbound criteria. In other exemplary embodiments, the indication of GNSS satellites 110 meeting the overbound criteria includes a list of the GNSS satellites 110 that do not meet the overbound criteria, which should not be used. In exemplary embodiments, the GNSS receiver 400 only uses GNSS data from the subset of GNSS satellites 110 indicated as meeting the overbound criteria. In exemplary embodiments, the GNSS receiver 400 generates a GBAS augmented GNSS navigation solution using the data from the subset of GNSS satellites 110 indicated as meeting the overbound criteria, the differential corrections, and the at least one one-σ (one-sigma) ionosphere error overbound value.

Figure 5:
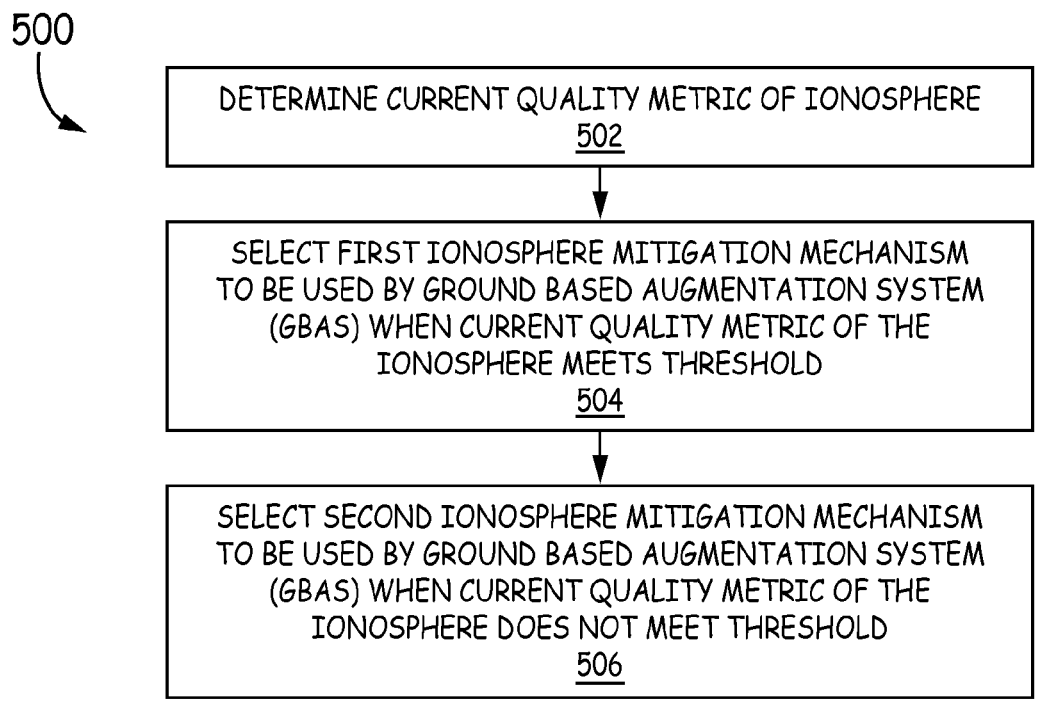
FIG. 5 is a flow diagram illustrating one exemplary embodiment of a method of selecting a GBAS ionospheric threat mitigation technique.

FIG. 5 is a flow diagram illustrating one exemplary embodiment of a method 500 of selecting a GBAS ionospheric threat mitigation technique. Method 500 begins at block 502 with determining a current quality metric of an ionosphere. In exemplary embodiments, the quality metric of the ionosphere is determined based on data received from a Space-Based Augmentation System (SBAS).

Method 500 proceeds to block 504 with selecting a first ionosphere mitigation mechanism to be used by a Ground Based Augmentation System (GBAS) when the current quality metric of the ionosphere meets a threshold. In exemplary embodiments, the first ionosphere mitigation mechanism is overbounding by adjusting the error bounding distance from the GNSS receiver by adding a K factor and/or sigma multiplier to create an overbound Vertical Ionosphere Gradient standard deviation sigma-vig ($\sigma_{vig}$).

Method 500 proceeds to block 506 with selecting a second ionosphere mitigation mechanisms to be used by the Ground Based Augmentation System (GBAS) when the current quality metric of the ionosphere does not meet the threshold. In exemplary embodiments, the second ionosphere mitigation mechanism is to screen any GNSS satellite geometries that produce an error larger than a tolerable limit assuming the worst case ionospheric gradient is present. In exemplary implementations, this GNSS satellite geometry screening is performed using Anomalous Ionospheric Geometry Screening (AIGS).

Figure 6:
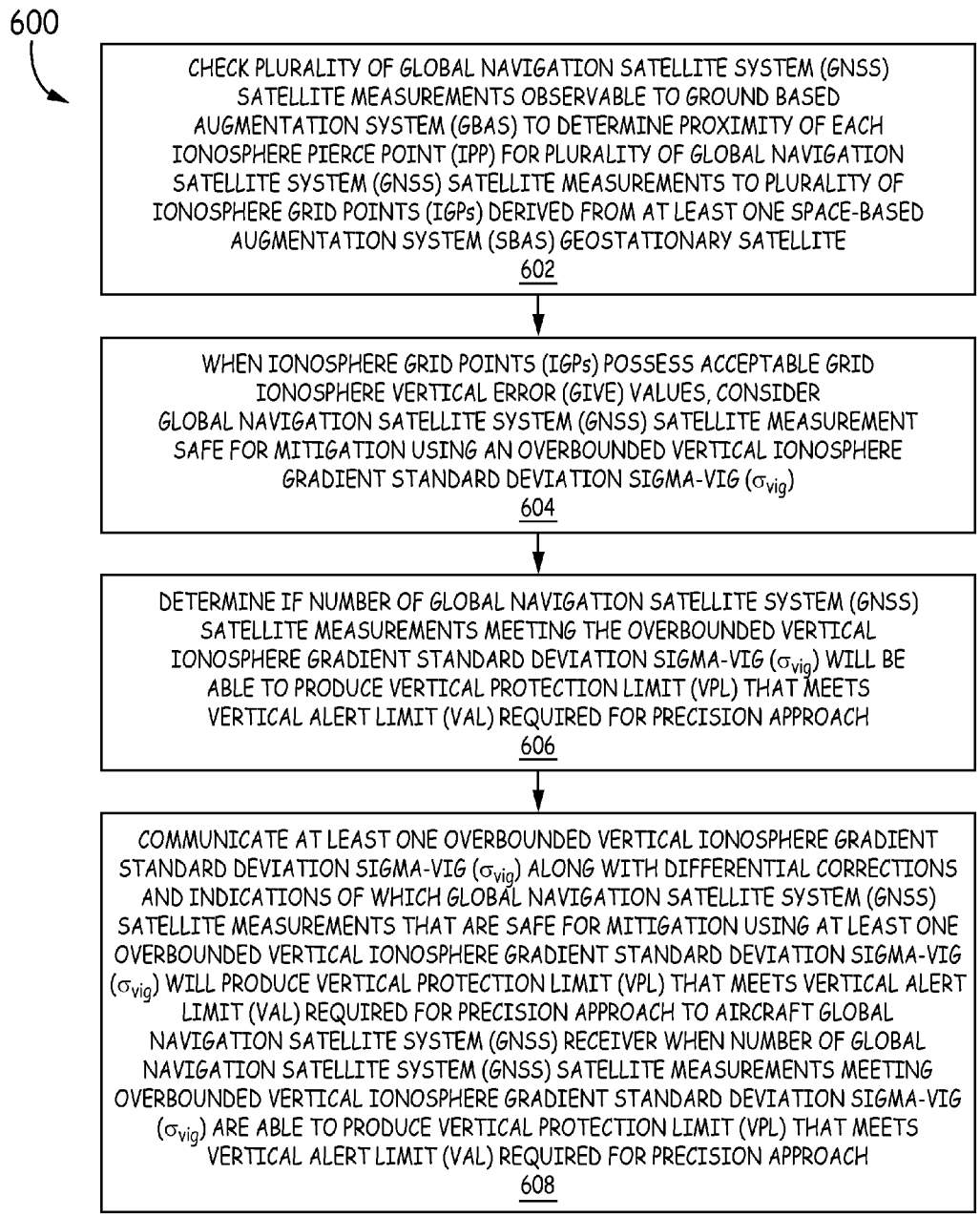
FIG. 6 is a flow diagram illustrating one exemplary embodiment of a method of using a Space-Based Augmentation System (SBAS) to mitigate error induced by an ionosphere for a Ground Based Augmentation System (GBAS) used with a Global Navigation Satellite System (GNSS).

FIG. 6 is a flow diagram illustrating one exemplary embodiment of a method 600 of using a Space-Based Augmentation System (SBAS) to mitigate error induced by an ionosphere for a Ground Based Augmentation System (GBAS) used with a Global Navigation Satellite System (GNSS). Method 600 begins at block 602 with checking a plurality of Global Navigation Satellite System (GNSS) satellite measurements observable to a Ground Based Augmentation System (GBAS) to determine a proximity of each Ionosphere Pierce Point (IPP) for the plurality of Global Navigation Satellite System (GNSS) satellite measurements to a plurality of Ionosphere Grid Points (IGPs) derived from at least one Space-Based Augmentation System (SBAS) geostationary satellite.

Method 600 proceeds to block 604 with when the Ionosphere Grid Points (IGPs) possess acceptable Grid Ionosphere Vertical Error (GIVE) values, considering the Global Navigation Satellite System (GNSS) satellite measurement safe for mitigation using an overbounded Vertical Ionosphere Gradient standard deviation sigma-vig ($\sigma_{vig}$). Method 600 proceeds to block 606 with determining if a number of Global Navigation Satellite System (GNSS) satellite measurements meeting the overbounded Vertical Ionosphere Gradient standard deviation sigma-vig ($\sigma_{vig}$) will be able to produce a vertical protection limit (VPL) that meets a Vertical Alert Limit (VAL) required for a precision approach.

Method 600 proceeds to block 608 with communicating the at least one overbounded Vertical Ionosphere Gradient standard deviation sigma-vig ($\sigma_{vig}$) along with differential corrections and an indication of which Global Navigation Satellite System (GNSS) satellite measurements that are safe for mitigation using the at least one overbounded Vertical Ionosphere Gradient standard deviation sigma-vig ($\sigma_{vig}$) will produce the Vertical Protection Limit (VPL) that meets the Vertical Alert Limit (VAL) required for a precision approach to an aircraft Global Navigation Satellite System (GNSS) receiver when the number of Global Navigation Satellite System (GNSS) satellite measurements meeting the overbounded Vertical Ionosphere Gradient standard deviation sigma-vig ($\sigma_{vig}$) are able to produce a vertical protection limit (VPL) that meets a Vertical Alert Limit (VAL) required for a precision approach.

In exemplary embodiments of method 600, the number of Global Navigation Satellite System (GNSS) satellite measurements determined safe for mitigation using the at least one overbounded Vertical Ionosphere Gradient standard deviation sigma-vig ($\sigma_{vig}$) will be able to produce the Vertical Protection Limit (VPL) that would be able to meet the Vertical Alert Limit (VAL) required for the precision approach when the Vertical Protection Limit (VPL) is less than the Vertical Alert Limit (VAL). In exemplary embodiments, method 600 further includes waiting a timeout period before resuming operation when the number of Global Navigation Satellite System (GNSS) satellite measurements determined safe for mitigation using the at least one overbounded Vertical Ionosphere Gradient standard deviation sigma-vig ($\sigma_{vig}$) would not be able to produce the Vertical Protection Limit (VPL) that would be able to meet the Vertical Alert Limit (VAL) required for precision approach.

In exemplary embodiments, method 600 further includes determining a Vertical Ionosphere Gradient standard deviation sigma-vig ($\sigma_{vig}$) based on a real-time screen of all possible Global Navigation Satellite System (GNSS) satellite geometries when there is not a number of Global Navigation Satellite System (GNSS) satellite measurements determined safe for mitigation using the at least one overbounded Vertical Ionosphere Gradient standard deviation sigma-vig ($\sigma_{vig}$) that are able to produce a Vertical Protection Limit (VPL) that meets a Vertical Alert Limit (VAL) required for a precision approach. In exemplary embodiments of method 600, the overbounded Vertical Ionosphere Gradient standard deviation sigma-vig ($\sigma_{vig}$) corresponds to Grid Ionosphere Vertical Error (GIVE) values around each of a plurality of Global Navigation Satellite System (GNSS) satellite's Ionosphere Pierce Point (IPP).

Figure 7:
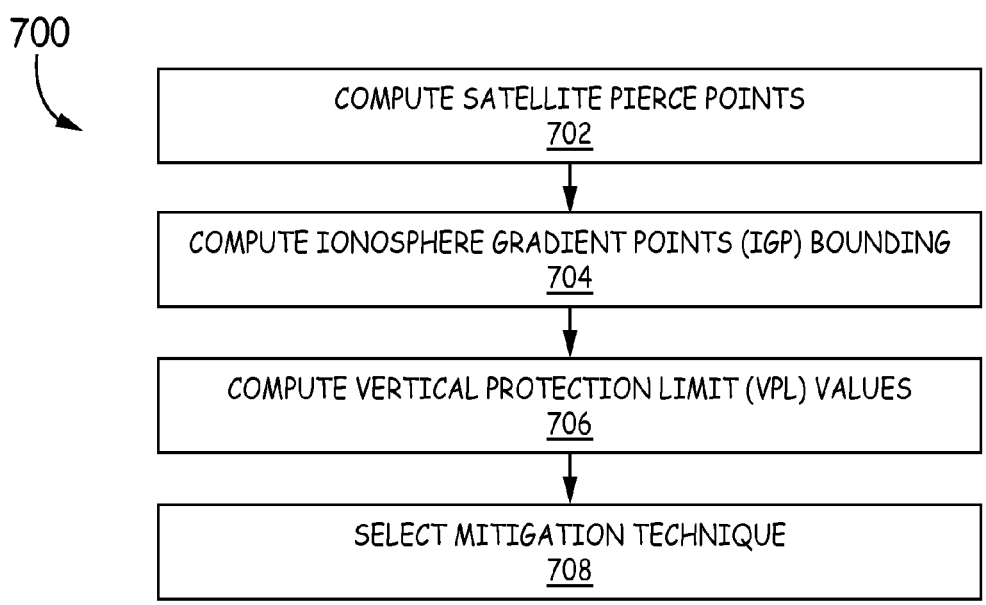
FIG. 7 is a flow diagram illustrating another exemplary embodiment of a method of selecting a GBAS ionospheric threat mitigation technique based on data from a GBAS.

FIG. 7 is a flow diagram illustrating one exemplary embodiment of a method 700 of selecting a GBAS ionospheric threat mitigation technique based on data from a GBAS. Method 700 begins at block 702 with computing GNSS satellite pierce points. Method 700 proceeds to block 704 with computing Ionosphere Gradient Points (IGPs) bounding. Method 700 proceeds to block 706 with computing vertical protection limit (VPL) values. Method 700 proceeds to block 708 with selecting a mitigation technique.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a Ground Based Augmentation System (GBAS) comprising: a plurality of reference receivers having known positions; at least one processing module communicatively coupled to the plurality of reference receivers; at least one aircraft communication device communicatively coupled to the at least one processing module; wherein the at least one processing module is configured to check a Global Navigation Satellite System (GNSS) satellite measurement for each of a plurality of Global Navigation Satellite System (GNSS) satellites to determine the proximity of each Global Navigation Satellite System (GNSS) satellite measurement's Ionosphere Pierce Point (IPP) to a plurality of Ionosphere Grid Points (IGPs) derived from at least one Space-Based Augmentation System (SBAS) geostationary satellite; wherein the at least one processing module is further configured to determine that the Global Navigation Satellite System (GNSS) satellite measurement for each of the plurality of Global Navigation Satellite System (GNSS) satellites is safe for mitigation using at least one overbounded Vertical Ionosphere Gradient standard deviation sigma-vig ($\sigma_{vig}$) when the Ionosphere Grid Points (IGPs) possess acceptable Grid Ionosphere Vertical Error (GIVE) values; wherein the at least one processing module is further configured to determine whether a number of Global Navigation Satellite System (GNSS) satellite measurements determined safe for mitigation using the at least one overbounded Vertical Ionosphere Gradient standard deviation sigma-vig ($\sigma_{vig}$) are able to produce a Vertical Protection Limit (VPL) that meets a Vertical Alert Limit (VAL) required for a precision approach; and wherein the at least one processing module is configured to cause the at least one aircraft communication device to communicate the at least one overbounded Vertical Ionosphere Gradient standard deviation sigma-vig ($\sigma_{vig}$) along with differential corrections and an indication of which Global Navigation Satellite System (GNSS) satellite measurements that are safe for mitigation using the at least one overbounded Vertical Ionosphere Gradient standard deviation sigma-vig ($\sigma_{vig}$) are able to produce the Vertical Protection Limit (VPL) that meets the Vertical Alert Limit (VAL) required for a precision approach to an aircraft GNSS receiver when the number of Global Navigation Satellite System (GNSS) satellite measurements determined safe for mitigation using the at least one overbounded Vertical Ionosphere Gradient standard deviation sigma-vig ($\sigma_{vig}$) are able to produce a Vertical Protection Limit (VPL) that meets a Vertical Alert Limit (VAL) required for a precision approach.

Example 2 includes the Ground Based Augmentation System (GBAS) of Example 1, wherein the plurality of reference receivers includes four reference receivers.

Example 3 includes the Ground Based Augmentation System (GBAS) of any of Examples 1-2, wherein the number of Global Navigation Satellite System (GNSS) satellite measurements determined safe for mitigation using the at least one overbounded Vertical Ionosphere Gradient standard deviation sigma-vig ($\sigma_{vig}$) are able to produce the Vertical Protection Limit (VPL) that meets the Vertical Alert Limit (VAL) required for the precision approach when the Vertical Protection Limit (VPL) is less than the Vertical Alert Limit (VAL).

Example 4 includes the Ground Based Augmentation System (GBAS) of any of Examples 1-3, wherein the at least one processing module is configured to wait a timeout period before resuming operation when the number of Global Navigation Satellite System (GNSS) satellite measurements determined safe for mitigation using the at least one overbounded Vertical Ionosphere Gradient standard deviation sigma-vig ($\sigma_{vig}$) are not able to produce the Vertical Protection Limit (VPL) that meets the Vertical Alert Limit (VAL) required for the precision approach.

Example 5 includes the Ground Based Augmentation System (GBAS) of any of Examples 1-4, wherein the at least one overbounded Vertical Ionosphere Gradient standard deviation sigma-vig ($\sigma_{vig}$) includes a separate overbounded Vertical Ionosphere Gradient standard deviation sigma-vig ($\sigma_{vig}$) for each of the plurality of Global Navigation Satellite System (GNSS) satellites.

Example 6 includes the Ground Based Augmentation System (GBAS) of any of Examples 1-5, wherein the at least one overbounded Vertical Ionosphere Gradient standard deviation sigma-vig ($\sigma_{vig}$) includes a single overbounded Vertical Ionosphere Gradient standard deviation sigma-vig ($\sigma_{vig}$) which covers a worst case Global Navigation Satellite System (GNSS) satellite measurement from the plurality of Global Navigation Satellite System (GNSS) satellites.

Example 7 includes the Ground Based Augmentation System (GBAS) of any of Examples 1-6, further comprising: wherein the at least one processing module is further configured to determine a Vertical Ionosphere Gradient standard deviation sigma-vig ($\sigma_{vig}$) based on a real-time screen of all possible Global Navigation Satellite System (GNSS) satellite geometries when there is not a number of Global Navigation Satellite System (GNSS) satellite measurements determined safe for mitigation using the at least one overbounded Vertical Ionosphere Gradient standard deviation sigma-vig ($\sigma_{vig}$) that are able to produce a Vertical Protection Limit (VPL) that meets a Vertical Alert Limit (VAL) required for a precision approach.

Example 8 includes the Ground Based Augmentation System (GBAS) of any of Examples 1-7, wherein the overbounded Vertical Ionosphere Gradient standard deviation sigma-vig ($\sigma_{vig}$) corresponds to Grid Ionosphere Vertical Error (GIVE) values around each of the plurality of Global Navigation Satellite System (GNSS) satellite's Ionosphere Pierce Point (IPP).

Example 9 includes a method of using a Space-Based Augmentation System (SBAS) to mitigate error induced by an ionosphere for a Ground Based Augmentation System (GBAS) used with a Global Navigation Satellite System (GNSS), the method comprising: checking a plurality of Global Navigation Satellite System (GNSS) satellite measurements observable to a Ground Based Augmentation System (GBAS) to determine a proximity of each Ionosphere Pierce Point (IPP) for the plurality of Global Navigation Satellite System (GNSS) satellite measurements to a plurality of Ionosphere Grid Points (IGPs) derived from at least one Space-Based Augmentation System (SBAS) geostationary satellite; when the Ionosphere Grid Points (IGPs) possess acceptable Grid Ionosphere Vertical Error (GIVE) values, considering the Global Navigation Satellite System (GNSS) satellite measurement safe for mitigation using an overbounded Vertical Ionosphere Gradient standard deviation sigma-vig ($\sigma_{vig}$); determining if a number of Global Navigation Satellite System (GNSS) satellite measurements meeting the overbounded Vertical Ionosphere Gradient standard deviation sigma-vig ($\sigma_{vig}$) will be able to produce a vertical protection limit (VPL) that meets a Vertical Alert Limit (VAL) required for a precision approach; and communicating the at least one overbounded Vertical Ionosphere Gradient standard deviation sigma-vig ($\sigma_{vig}$) along with differential corrections and an indication of which Global Navigation Satellite System (GNSS) satellite measurements that are safe for mitigation using the at least one overbounded Vertical Ionosphere Gradient standard deviation sigma-vig ($\sigma_{vig}$) will produce the Vertical Protection Limit (VPL) that meets the Vertical Alert Limit (VAL) required for a precision approach to an aircraft Global Navigation Satellite System (GNSS) receiver when the number of Global Navigation Satellite System (GNSS) satellite measurements meeting the overbounded Vertical Ionosphere Gradient standard deviation sigma-vig ($\sigma_{vig}$) are able to produce a vertical protection limit (VPL) that meets a Vertical Alert Limit (VAL) required for a precision approach.

Example 10 includes the method of Example 9, wherein the number of Global Navigation Satellite System (GNSS) satellite measurements determined safe for mitigation using the at least one overbounded Vertical Ionosphere Gradient standard deviation sigma-vig ($\sigma_{vig}$) will be able to produce the Vertical Protection Limit (VPL) that would be able to meet the Vertical Alert Limit (VAL) required for the precision approach when the Vertical Protection Limit (VPL) is less than the Vertical Alert Limit (VAL).

Example 11 includes the method of any of Examples 9-10, further comprising: waiting a timeout period before resuming operation when the number of Global Navigation Satellite System (GNSS) satellite measurements determined safe for mitigation using the at least one overbounded Vertical Ionosphere Gradient standard deviation sigma-vig ($\sigma_{vig}$) would not be able to produce the Vertical Protection Limit (VPL) that would be able to meet the Vertical Alert Limit (VAL) required for precision approach.

Example 12 includes the method of any of Examples 9-11, further comprising: determining a Vertical Ionosphere Gradient standard deviation sigma-vig ($\sigma_{vig}$) based on a real-time screen of all possible Global Navigation Satellite System (GNSS) satellite geometries when there is not a number of Global Navigation Satellite System (GNSS) satellite measurements determined safe for mitigation using the at least one overbounded Vertical Ionosphere Gradient standard deviation sigma-vig ($\sigma_{vig}$) that are able to produce a Vertical Protection Limit (VPL) that meets a Vertical Alert Limit (VAL) required for a precision approach.

Example 13 includes the method of any of Examples 9-12, wherein the overbounded Vertical Ionosphere Gradient standard deviation sigma-vig ($\sigma_{vig}$) corresponds to Grid Ionosphere Vertical Error (GIVE) values around each of a plurality of Global Navigation Satellite System (GNSS) satellite's Ionosphere Pierce Point (IPP).

Example 14 includes a Ground Based Augmentation System (GBAS) comprising: a plurality of reference receivers having known positions; at least one processing module communicatively coupled to the plurality of reference receivers; at least one aircraft communication device communicatively coupled to the at least one processing module; wherein the at least one processing module is configured to determine a current quality metric of an ionosphere based on data received from at least one Space-Based Augmentation System (SBAS) geostationary satellite; and wherein the at least one processing module is further configured to determine at least one overbounded Vertical Ionosphere Gradient standard deviation sigma-vig ($\sigma_{vig}$) based on the data received from the at least one Space-Based Augmentation System (SBAS) geostationary satellite when the current quality metric of the ionosphere meets a threshold.

Example 15 includes the Ground Based Augmentation System (GBAS) of Example 14, wherein the at least one overbounded Vertical Ionosphere Gradient standard deviation sigma-vig ($\sigma_{vig}$) includes a separate overbounded Vertical Ionosphere Gradient standard deviation sigma-vig ($\sigma_{vig}$) for a plurality of Global Navigation Satellite System (GNSS) satellites.

Example 16 includes the Ground Based Augmentation System (GBAS) of any of Examples 14-15, wherein the at least one overbounded Vertical Ionosphere Gradient standard deviation sigma-vig ($\sigma_{vig}$) includes a single overbounded Vertical Ionosphere Gradient standard deviation sigma-vig ($\sigma_{vig}$) which covers a worst case Global Navigation Satellite System (GNSS) satellite measurement from a plurality of Global Navigation Satellite System (GNSS) satellites.

Example 17 includes the Ground Based Augmentation System (GBAS) of any of Examples 14-16, further comprising: wherein the at least one processing module is further configured to determine a Vertical Ionosphere Gradient standard deviation sigma-vig ($\sigma_{vig}$) based on a real-time screen of all possible Global Navigation Satellite System (GNSS) satellite geometries when the current quality metric of the ionosphere does not meet the threshold.

Example 18 includes the Ground Based Augmentation System (GBAS) of any of Examples 14-17, wherein the current quality metric of the ionosphere meets the threshold when a number of Global Navigation Satellite System (GNSS) satellite measurements determined safe for mitigation using the overbound will be able to produce a Vertical Protection Limit (VPL) that would be able to meet a Vertical Alert Limit (VAL) required for precision approach.

Example 19 includes the Ground Based Augmentation System (GBAS) of any of Examples 14-18, further comprising: wherein the at least one processing module is further configured to communicate the at least one overbounded Vertical Ionosphere Gradient standard deviation sigma-vig ($\sigma_{vig}$) along with differential corrections and an indication of which Global Navigation Satellite System (GNSS) satellites meet the overbounded Vertical Ionosphere Gradient standard deviation sigma-vig ($\sigma_{vig}$) to an aircraft Global Navigation Satellite System (GNSS) receiver when the current quality metric of the ionosphere meets the threshold.

Example 20 includes the Ground Based Augmentation System (GBAS) of Example 19, wherein the overbounded Vertical Ionosphere Gradient standard deviation sigma-vig ($\sigma_{vig}$) corresponds to Grid Ionosphere Vertical Error (GIVE) values around each Global Navigation Satellite System (GNSS) satellite's Ionosphere Pierce Point (IPP).

What is claimed is:

1. A Ground Based Augmentation System (GBAS) comprising:
   a plurality of reference receivers having known positions;
   at least one processing module communicatively coupled to the plurality of reference receivers;
   at least one aircraft communication device communicatively coupled to the at least one processing module;
   wherein the at least one processing module is configured to check a Global Navigation Satellite System (GNSS) satellite measurement for each of a plurality of Global Navigation Satellite System (GNSS) satellites to determine a proximity of each Global Navigation Satellite System (GNSS) satellite measurement's Ionosphere Pierce Point (IPP) to a plurality of Ionosphere Grid Points (IGPs) derived from at least one Space-Based Augmentation System (SBAS) geostationary satellite;

wherein the at least one processing module is further configured to determine that the Global Navigation Satellite System (GNSS) satellite measurement for each of the plurality of Global Navigation Satellite System (GNSS) satellites is safe for mitigation using at least one overbounded Vertical Ionosphere Gradient standard deviation sigma-vig ($\sigma_{vig}$) when the Ionosphere Grid Points (IGPs) possess acceptable Grid Ionosphere Vertical Error (GIVE) values;

wherein the at least one processing module is further configured to determine whether a number of Global Navigation Satellite System (GNSS) satellite measurements determined safe for mitigation using the at least one overbounded Vertical Ionosphere Gradient standard deviation sigma-vig ($\sigma_{vig}$) are able to produce a Vertical Protection Limit (VPL) that meets a Vertical Alert Limit (VAL) required for a precision approach; and wherein the at least one processing module is configured to cause the at least one aircraft communication device to communicate the at least one overbounded Vertical Ionosphere Gradient standard deviation sigma-vig ($\sigma_{vig}$) along with differential corrections for at least one of the plurality of GNSS satellites and an indication of which Global Navigation Satellite System (GNSS) satellite measurements that are safe for mitigation using the at least one overbounded Vertical Ionosphere Gradient standard deviation sigma-vig ($\sigma_{vig}$) are able to produce the Vertical Protection Limit (VPL) that meets the Vertical Alert Limit (VAL) required for the precision approach to an aircraft GNSS receiver when the number of Global Navigation Satellite System (GNSS) satellite measurements determined safe for mitigation using the at least one overbounded Vertical Ionosphere Gradient standard deviation sigma-vig ($\sigma_{vig}$) are able to produce a Vertical Protection Limit (VPL) that meets a Vertical Alert Limit (VAL) required for the precision approach.

2. The Ground Based Augmentation System (GBAS) of claim 1, wherein the plurality of reference receivers includes four reference receivers.

3. The Ground Based Augmentation System (GBAS) of claim 1, wherein the number of Global Navigation Satellite System (GNSS) satellite measurements determined safe for mitigation using the at least one overbounded Vertical Ionosphere Gradient standard deviation sigma-vig ($\sigma_{vig}$) are able to produce the Vertical Protection Limit (VPL) that meets the Vertical Alert Limit (VAL) required for the precision approach when the Vertical Protection Limit (VPL) is less than the Vertical Alert Limit (VAL).

4. The Ground Based Augmentation System (GBAS) of claim 1, wherein the at least one processing module is configured to wait a timeout period before resuming operation when the number of Global Navigation Satellite System (GNSS) satellite measurements determined safe for mitigation using the at least one overbounded Vertical Ionosphere Gradient standard deviation sigma-vig ($\sigma_{vig}$) are not able to produce the Vertical Protection Limit (VPL) that meets the Vertical Alert Limit (VAL) required for the precision approach.

5. The Ground Based Augmentation System (GBAS) of claim 1, wherein the at least one overbounded Vertical Ionosphere Gradient standard deviation sigma-vig ($\sigma_{vig}$) includes a separate overbounded Vertical Ionosphere Gradient standard deviation sigma-vig ($\sigma_{vig}$) for each of the plurality of Global Navigation Satellite System (GNSS) satellites.

6. The Ground Based Augmentation System (GBAS) of claim 1, wherein the at least one overbounded Vertical Ionosphere Gradient standard deviation sigma-vig ($\sigma_{vig}$) includes a single overbounded Vertical Ionosphere Gradient standard deviation sigma-vig ($\sigma_{vig}$) which covers a worst case Global Navigation Satellite System (GNSS) satellite measurement from the plurality of Global Navigation Satellite System (GNSS) satellites.

7. The Ground Based Augmentation System (GBAS) of claim 1, further comprising:

wherein the at least one processing module is further configured to determine a Vertical Ionosphere Gradient standard deviation sigma-vig ($\sigma_{vig}$) based on a real-time screen of all possible Global Navigation Satellite System (GNSS) satellite geometries when there is not the number of Global Navigation Satellite System (GNSS) satellite measurements determined safe for mitigation using the at least one overbounded Vertical Ionosphere Gradient standard deviation sigma-vig ($\sigma_{vig}$) that are able to produce a Vertical Protection Limit (VPL) that meets a Vertical Alert Limit (VAL) required for a precision approach.

8. The Ground Based Augmentation System (GBAS) of claim 1, wherein the overbounded Vertical Ionosphere Gradient standard deviation sigma-vig ($\sigma_{vig}$) corresponds to Grid Ionosphere Vertical Error (GIVE) values around each of the plurality of Global Navigation Satellite System (GNSS) satellite's Ionosphere Pierce Point (IPP).

9. A method of using a Space-Based Augmentation System (SBAS) to mitigate error induced by an ionosphere for a Ground Based Augmentation System (GBAS) used with a Global Navigation Satellite System (GNSS), the method comprising:

checking a plurality of Global Navigation Satellite System (GNSS) satellite measurements observable to a Ground Based Augmentation System (GBAS) to determine a proximity of each Ionosphere Pierce Point (IPP) for the plurality of Global Navigation Satellite System (GNSS) satellite measurements to a plurality of Ionosphere Grid Points (IGPs) derived from at least one Space-Based Augmentation System (SBAS) geostationary satellite;

when the Ionosphere Grid Points (IGPs) possess acceptable Grid Ionosphere Vertical Error (GIVE) values, considering the Global Navigation Satellite System (GNSS) satellite measurement safe for mitigation using an overbounded Vertical Ionosphere Gradient standard deviation sigma-vig ($\sigma_{vig}$);

determining if a number of Global Navigation Satellite System (GNSS) satellite measurements meeting the overbounded Vertical Ionosphere Gradient standard deviation sigma-vig ($\sigma_{vig}$) will be able to produce a vertical protection limit (VPL) that meets a Vertical Alert Limit (VAL) required for a precision approach; and communicating the at least one overbounded Vertical Ionosphere Gradient standard deviation sigma-vig ($\sigma_{vig}$) along with differential corrections for at least one of the plurality of GNSS satellites and an indication of which Global Navigation Satellite System (GNSS) satellite measurements that are safe for mitigation using the at least one overbounded Vertical Ionosphere Gradient standard deviation sigma-vig ($\sigma_{vig}$) will produce the Vertical Protection Limit (VPL) that meets the Vertical Alert Limit (VAL) required for the precision approach to an aircraft Global Navigation Satellite System (GNSS) receiver when the number of Global Navigation Satellite System (GNSS) satellite measurements meeting the overbounded Vertical Ionosphere Gradient standard deviation sigma-vig ($\sigma_{vig}$) are able to produce a vertical protection limit (VPL) that meets a Vertical Alert Limit (VAL) required for the precision approach.

10. The method of claim 9, wherein the number of Global Navigation Satellite System (GNSS) satellite measurements determined safe for mitigation using the at least one overbounded Vertical Ionosphere Gradient standard deviation sigma-vig ($\sigma_{vig}$) will be able to produce the Vertical Protection Limit (VPL) that would be able to meet the Vertical Alert Limit (VAL) required for the precision approach when the Vertical Protection Limit (VPL) is less than the Vertical Alert Limit (VAL).

11. The method of claim 9, further comprising:
waiting a timeout period before resuming operation when the number of Global Navigation Satellite System (GNSS) satellite measurements determined safe for mitigation using the at least one overbounded Vertical Ionosphere Gradient standard deviation sigma-vig ($\sigma_{vig}$) would not be able to produce the Vertical Protection Limit (VPL) that would be able to meet the Vertical Alert Limit (VAL) required for the precision approach.

12. The method of claim 9, further comprising:
determining a Vertical Ionosphere Gradient standard deviation sigma-vig ($\sigma_{vig}$) based on a real-time screen of all possible Global Navigation Satellite System (GNSS) satellite geometries when there is not the number of Global Navigation Satellite System (GNSS) satellite measurements determined safe for mitigation using the at least one overbounded Vertical Ionosphere Gradient standard deviation sigma-vig ($\sigma_{vig}$) that are able to produce a Vertical Protection Limit (VPL) that meets a Vertical Alert Limit (VAL) required for the precision approach.

13. The method of claim 9, wherein the overbounded Vertical Ionosphere Gradient standard deviation sigma-vig ($\sigma_{vig}$) corresponds to Grid Ionosphere Vertical Error (GIVE) values around each of a plurality of Global Navigation Satellite System (GNSS) satellite's Ionosphere Pierce Point (IPP).

14. A Ground Based Augmentation System (GBAS) comprising:
a plurality of reference receivers having known positions;
at least one processing module communicatively coupled to the plurality of reference receivers;
at least one aircraft communication device communicatively coupled to the at least one processing module;
wherein the at least one processing module is configured to determine a current quality metric of an ionosphere based on data received from at least one Space-Based Augmentation System (SBAS) geostationary satellite; and
wherein the at least one processing module is further configured to determine at least one overbounded Vertical Ionosphere Gradient standard deviation sigma-vig ($\sigma_{vig}$) based on the data received from the at least one Space-Based Augmentation System (SBAS) geostationary satellite when the current quality metric of the ionosphere meets a threshold.

15. The Ground Based Augmentation System (GBAS) of claim 14, wherein the at least one overbounded Vertical Ionosphere Gradient standard deviation sigma-vig ($\sigma_{vig}$) includes a separate overbounded Vertical Ionosphere Gradient standard deviation sigma-vig ($\sigma_{vig}$) for a plurality of Global Navigation Satellite System (GNSS) satellites.

16. The Ground Based Augmentation System (GBAS) of claim 14, wherein the at least one overbounded Vertical Ionosphere Gradient standard deviation sigma-vig ($\sigma_{vig}$) includes a single overbounded Vertical Ionosphere Gradient standard deviation sigma-vig ($\sigma_{vig}$) which covers a worst case Global Navigation Satellite System (GNSS) satellite measurement from a plurality of Global Navigation Satellite System (GNSS) satellites.

17. The Ground Based Augmentation System (GBAS) of claim 14, further comprising:
wherein the at least one processing module is further configured to determine a Vertical Ionosphere Gradient standard deviation sigma-vig ($\sigma_{vig}$) based on a real-time screen of all possible Global Navigation Satellite System (GNSS) satellite geometries when the current quality metric of the ionosphere does not meet the threshold.

18. The Ground Based Augmentation System (GBAS) of claim 14, wherein the current quality metric of the ionosphere meets the threshold when a number of Global Navigation Satellite System (GNSS) satellite measurements determined safe for mitigation using the overbound will be able to produce a Vertical Protection Limit (VPL) that would be able to meet a Vertical Alert Limit (VAL) required for precision approach.

19. The Ground Based Augmentation System (GBAS) of claim 14, further comprising:
wherein the at least one processing module is further configured to communicate the at least one overbounded Vertical Ionosphere Gradient standard deviation sigma-vig ($\sigma_{vig}$) along with differential corrections for at least one of the plurality of GNSS satellites and an indication of which Global Navigation Satellite System (GNSS) satellites meet the overbounded Vertical Ionosphere Gradient standard deviation sigma-vig ($\sigma_{vig}$) to an aircraft Global Navigation Satellite System (GNSS) receiver when the current quality metric of the ionosphere meets the threshold.

20. The Ground Based Augmentation System (GBAS) of claim 19, wherein the overbounded Vertical Ionosphere Gradient standard deviation sigma-vig ($\sigma_{vig}$) corresponds to Grid Ionosphere Vertical Error (GIVE) values around each Global Navigation Satellite System (GNSS) satellite's Ionosphere Pierce Point (IPP).

* * * * *